Patented Mar. 13, 1951

2,545,161

UNITED STATES PATENT OFFICE 2,545,161

ETHYL ALCOHOL PRODUCTION

Charles E. Morrell, Roselle, and Richard F. Robey, Cranford, N. J., assignors to Standard Oil Development Company, a corporation of Delaware No Drawing. Application June 28, 1947, Serial No. 757,956

3 Claims. (Cl. 260—639)

This invention relates to improvements in the production of alcohols and more particularly to an improved process for the production of ethyl alcohol. Specifically the invention relates to the improvement in ethyl alcohol production by the absorption of ethylene in strong mineral acid by operating the absorption vessel with a rising temperature gradient in the direction of increasing extract saturation.

Processes for the conversion of ethylene, generally supplied as a gaseous mixture of hydrogen, methane, ethane and varying amounts of ethylene, to ethyl alcohol by absorption in strong mineral acids such as sulfuric acid are well known. In such processes, using sulfuric acid as an illustration of the absorption medium, the gaseous mixture containing the ethylene is contacted with sulfuric acid, generally countercurrently in an absorption tower, forming monoethyl sulfate and diethyl sulfate in varying proportions as a result of the interaction between the ethylene and the acid. The reaction product consisting of the above-mentioned sulfates and containing some unreacted sulfuric acid is commonly designated as the extract and varies in saturation depending upon the reactants and condition of absorption. The extract is thereafter diluted with water and heated whereby the sulfates are hydrolyzed to ethyl alcohol which is recovered by distillation. It is generally desirable to form an extract of as high a saturation as possible during the absorption process in order to obtain the highest possible conversion to ethyl alcohol and also the greatest utilization of the acid in a single cycle between absorption, dilution and reconcentration. Usually, the mols of ethylene per mol of acid in the extract rarely exceeds 1.30 to 1.40 which is only 65–70% of the theoretical amount of ethylene reactable with sulfuric acid.

It is an object of this invention to develop an absorption process for increasing the concentration of ethylene in the acid extract on a mol per mol basis and at a more rapid rate of absorption.

It is another object of this invention to obtain a greater percentage of useful product per mol of extract.

It is another object of this invention to promote a decrease in acid consumption with accompanying decrease in deterioration of the acid.

It is therefore another object of this invention to prevent buildup of undesirable carbonaceous material in the spent acid from the absorption process.

These and other objects of the invention will be apparent to those skilled in the art from the description to follow.

It is known that extracts of ethylene in 96–98% sulfuric acid when only partially saturated are unstable at temperatures in the neighborhood of 85–100° C. and above, and, to avoid degradation and consequent loss of alcohol yield, it is necessary to maintain temperatures as low as is consistent with reasonable rates of reaction or absorption in the zones where the extract strength is below 1.3 mols of ethylene per mol of sulfuric acid. However, extracts of 1.3 and higher saturations are definitely much more stable, even at temperatures around 100° C. to ethylene degradation reactions. It has been found therefore, that a higher temperature in the portion of the column or vessel holding the higher saturation extracts definitely increases the rate of reaction of ethylene with these extracts, thus building up the extract saturation which in turn results in a greater yield of alcohol for the acid utilized. Such desirable results are obtainable by operating the absorption tower under a temperature gradient increasing from the top of the tower to the base. These results are apparent from a comparison of operations under constant temperature and under temperature gradient decreasing from top to bottom as will be set out below.

It has been found that the usable extract savings amounts to 11% more useful product per mol of acid as compared to operation of the absorption tower at constant absorption temperature. At the same time a 9% decrease in acid degradation takes place as compared to the latter case. The temperature employed within the absorption tower may vary with the concentration of the extract in the tower. For example, if fresh strong sulfuric acid is being added to the top of the absorption tower the temperature is kept low so as not to accentuate the corrosiveness of the acid. This may be obviated by tempering the acid with an added amount of extract recirculated from about midway in the absorber to the fresh acid feed. In the latter event a higher temperature may be employed at the top of the tower as the presence of the extract tends to counteract the corrosiveness of the fresh acid. In general the temperature within the absorption tower ranges from about as low as 65° C. at the top of the tower to as high as 110° C. at the base of the column. Preferably the tower is operated at a temperature gradient ranging from about 70° C. at the top of the tower to about 90–95° C. at the base of the tower. When the tower is so operated it will be seen that a substantial increase in useful products from the absorption and subsequent hydrolysis of the extract is obtained over that obtained when operating at a constant tower temperature or operating under a temperature gradient increasing from the base to the top of the tower. The absorption tower is operated under sufficient total pressure to assure the necessary ethylene partial pressure in the absorption process. Ethylene partial pressures in the incoming gas stream (to the absorber) in the neighborhood of 150–200 p. s. i. g. or above are desired.

In the process of this invention, ethylene is fed into an absorber in the form of a gas consisting of from 30% or more ethylene with the remainder hydrogen, methane, ethane and a small amount of higher hydrocarbons, e. g. propylene. The ethylene-containing stream passes upwardly through the absorber, preferably countercurrently to a stream of sulfuric acid which is fed to the top of the absorber as 95–100% sulfuric acid on a hydrocarbon-free basis. A total pressure in the absorber of the range of 500 p. s. i. g. has been found suitable for normal absorption conditions. The total pressure is not critical and any total pressure may be employed which will insure an ethylene partial pressure of 150–200 or above p. s. i. g. in the incoming ethylene-containing stream. The sulfuric acid reacts with the ethylene and is removed from the bottom of the absorber as an acid extract containing usually 1.2–1.4 mols of absorbed ethylene per mol of acid. As mentioned above the strong sulfuric acid of the concentration entering the top of the tower is highly corrosive. To counteract this corrosive effect a relatively non-corrosive extract portion of approximately 0.8 saturation may be withdrawn from a point midway in the absorber and recirculated to the top of the tower to modify the corrosiveness of the fresh acid feed. The extract containing about 1.2–1.4 mols of ethylene per mol of acid is then removed from the bottom of the absorber and hydrolyzed to convert it to ethyl alcohol which is recovered by distillation. Fresh acid is fed to the absorber at a rate sufficient to compensate for the extract removed. Before the extract is hydrolyzed it is customary in the process to conduct it from the absorber to a soaking drum or time tank where it is allowed to become enriched in ethylene thereby increasing its saturation. Such a soaking or enriching process usually occurs for a period of 1–3 hours during which the extract is built up to a 1.5 saturation, i. e. the extract contains 1.5 mols of ethylene per mol of acid.

By operating the absorption tower under a temperature gradient increasing from the top to the base of the tower as previously described, rapid buildup of the extract to a saturation previously obtained only after a period of hours in the soaking drum is attained. Rapid buildup of the extract to high saturation reduces the opportunity of free acid to exert detrimental effects within the tower. Free sulfuric acid such as is present in larger concentrations in lower saturation extracts acts as an oxidizing agent contributing to extract loss as $CO_2$ and other products, and acid loss as $SO_2$. The resulting degradation causes loss of alcohol yield, and increased foaming of the extract leading to harmful emulsion problems. Likewise the acid becomes contaminated with carbonaceous material thereby provoking difficulties in reconcentration and contributing to higher overall acid consumption.

Runs have been made for the conversion of ethylene to ethyl alcohol by hydration of the ethylene with 97.7% sulfuric acid in the recommended partial pressure range for the incoming gas. In these runs the temperature range was varied but the ethylene partial pressure in the feed gas was maintained constant. Run #A–33 was carried out with a tower temperature of 82°–87° C. (considered essentially constant throughout the tower). Run #A–33–G with a temperature gradient ranging from 89° C. at the top of the tower to 75° C. at the base; and run #A–38 with a temperature of 82° C. at the top of the tower progressing to 95° C. at the base. The results of these runs are set forth in the following table:

|  | Temp. Constant | Temp. Gradient Upward | Temp. Gradient Downward |
|---|---|---|---|
| Run No | A–33 | A–33–G | A–38 |
| Pressure, p. s. i. g | 500 | 500 | 500 |
| Temp., °C., Top | 82 | 89 | 82 |
| Temp., °C., Bottom | 87 | 75 | 95 |
| Acid Feed, Per Cent $H_2SO_4$ | 97.7 | 97.7 | 97.7 |
| Acid Rate, g. p. h | 7.4 | 8.9 | 6.5 |
| Recycle Rate, g. p. h | 12 | 14 | 12 |
| Mol Feed Ratio | 1.47 | 1.40 | 1.66 |
| Extract Satn., Total mols $C_2H_4$/mol $H_2SO_4$ | 1.38 | 1.35 | 1.50 |
| Ethylene absorbed, per cent of that fed | 94.9 | 95.9 | 92.8 |
| $C_2H_4$ as Esters | 87.6 \} 93.1 | 89.6 \} 92.4 | 85.3 \} 94.1 |
| $C_2H_4$ as Ether | 5.5 | 2.8 | 8.8 |
| $C_2H_4$ as N. H. Carbon | 1.7 \} 7.9 | 1.3 \} 8.6 | 2.4 \} 5.9 |
| $C_2H_4$ as Unknown | 6.2 | 7.3 | 3.5 |
| Net degradation to non-useful products, mols $C_2H_4$/mol acid used | 0.109 | 0.116 | 0.0885 |
| Alcohol yield, mols/mol $H_2SO_4$ used | 1.15 | 1.21 | 1.28 |
| Alcohol+Ether yield, mols $C_2H_4$/mol $H_2SO_4$ used | 1.285 | 1.247 | 1.412 |

It is seen that 11.3% greater alcohol yield per mol of acid is produced when operating with temperature increasing from the top to the base of the absorption tower over the constant tower temperature operation and 9.1% more alcohol + ether are produced (A–38 vs. A–33). Also 6% more alcohol and 13.2% more alcohol + ether are produced than with the temperature gradient decreasing from the top of the tower to the bottom (A–38 vs. A–33–G). Expressing this advantage in other terms a given alcohol yield or a given alcohol plus ether yield can be obtained with less acid by operating with the temperature increasing down the tower than by the other alternative methods outlined. In addition, acid degradation is prevented thereby allowing easier reconcentration of the spent acid. The spent acid which is usually of about 40% acid concentration after hydrolysis and stripping must be reconcentrated to 97–98% acid. Heat requirement and/or steam consumption are accordingly appreciably reduced in the reconcentration operation. About 9% less degradation products are present in the spent acid than found with the customary constant tower temperature operation.

To control the temperature in the tower known commercial temperature controls may be installed on each plate in the tower to control the water flow to the coil to each plate. Due to the lag between the temperature of the plate and the cooling coil it may sometimes happen that these controllers will not operate satisfactorily. If so a circulating hot water system may be installed.

The latter has afforded satisfactory uniform control.

Although the examples cited illustrate the invention with respect to the absorption of ethylene with sulfuric acid, it is to be understood that the invention is not limited to the use of sulfuric acid alone. Other relatively strong polybasic mineral acids such as phosphoric acid, benzene-sulfonic acid, toluene-sulfonic acid, etc., or mixtures of these, or mixtures of these with sulfuric acid may be employed in place of the sulfuric acid.

The above is an outline of the invention such that it may be practiced by one skilled in the art. It is understood that this invention is not to be limited to the examples given and that various modifications thereof may be made without departing from the scope of the invention.

What is claimed is:

1. A process for the preparation of ethyl sulfates which comprises passing ethylene into the lower portion of an absorption zone, passing concentrated sulfuric acid into the upper portion of the absorption zone, permitting intimate contact between the ethylene and sulfuric acid and maintaining progressively increased temperatures within the absorption zone ranging from about 65° C. to 82° C. in the upper portion of the absorption zone to about 90° C. to 110° C. in the lower portion of the absorption zone.

2. A process for the preparation of ethyl sulfates which comprises passing ethylene into the lower portion of an absorption zone, passing concentrated sulfuric acid into the upper portion of the absorption zone, permitting intimate contact between the ethylene and sulfuric acid and maintaining progressively increased temperatures within the absorption zone ranging from about 70° C. in the upper portion of the absorption zone to about 90° C. in the lower portion of the absorption zone.

3. A process for the preparation of ethyl alcohol which comprises passing ethylene into the lower portion of an absorption zone, passing concentrated sulfuric acid into the upper portion of said absorption zone, maintaining progressively increasing temperatures within the absorption zone ranging from about 65° C. to 82° C. in the upper portion of the absorption zone to about 90° C. to 110° C. in the lower portion of the absorption zone, withdrawing a mixture of ethyl sulfates from the bottom of the absorption zone and hydrolyzing the mixture of ethyl sulfates for conversion to ethyl alcohol.

CHARLES E. MORRELL.
RICHARD F. ROBEY.

REFERENCES CITED

The following references are of record in the file of this patent:

UNITED STATES PATENTS

| Number | Name | Date |
|---|---|---|
| 1,695,249 | Curme et al. | Dec. 11, 1928 |
| 1,919,618 | Brooks | July 25, 1933 |
| 1,991,948 | Lacy | Feb. 19, 1935 |
| 2,096,879 | Brooks | Oct. 26, 1937 |
| 2,424,186 | Packie et al. | July 15, 1947 |